United States Patent [19]

Hayashida et al.

[11] 4,159,950

[45] Jul. 3, 1979

[54] FILTER APPARATUS

[76] Inventors: Sanae Hayashida, 1 Shimomisu-Yamaden, Yoko-Ohji, Fushimi-ku, Kyoto; Gorou Sasaki, 3-41, Senrioka, 4-chome, Settsu-shi, Osaka, both of Japan

[21] Appl. No.: 872,376

[22] Filed: Jan. 26, 1978

Related U.S. Application Data

[63] Continuation-in-part of Ser. No. 761,526, Jan. 24, 1977, abandoned.

[30] Foreign Application Priority Data

Apr. 1, 1976 [JP] Japan ................... 51-36770

[51] Int. Cl.² ............. B01D 33/24; B01D 33/06; B01D 35/16
[52] U.S. Cl. ................. 210/330; 210/335; 210/489; 210/492; 210/498
[58] Field of Search ........... 210/77, 326, 330, 335, 210/359, 488, 489, 492, 498

[56] References Cited

U.S. PATENT DOCUMENTS

| | | | |
|---|---|---|---|
| 1,640,698 | 8/1927 | Forsberg | 210/488 |
| 1,866,970 | 7/1932 | Garland et al. | 210/330 |
| 2,230,307 | 2/1941 | Munch | 210/488 |
| 2,581,337 | 1/1952 | Lapik | 210/488 |
| 2,601,521 | 6/1952 | Heftlex | 210/488 |
| 3,048,276 | 8/1962 | Darnell | 210/488 |
| 3,224,587 | 12/1965 | Schmidt, Jr. | 210/330 |
| 3,630,359 | 12/1971 | Pan et al. | 210/326 |

FOREIGN PATENT DOCUMENTS

| | | | |
|---|---|---|---|
| 608097 | 12/1934 | Fed. Rep. of Germany | 210/488 |
| 46416 | 11/1972 | Japan | 210/330 |
| 486397 | 6/1938 | United Kingdom | 210/488 |

*Primary Examiner*—Frank W. Lutter
*Assistant Examiner*—Gregory N. Clements
*Attorney, Agent, or Firm*—Moonray Kojima

[57] ABSTRACT

A filter apparatus comprising a container, a plurality of sets of rotatable filter elements disposed in the container, each set comprising first and second circular filter plates of different diameters with one or more holes provided in each plate at predetermined distance from the center thereof, and interleaved with third plates of a smaller diameter than the first and second plates, with the sets disposed in a line and sealed in the container with exits provided aligned with the holes. The sets of filter plates are rotated in the same direction. Unfiltered material is supplied to the container at the top and due to the centrifugal force of the rotating plates, the sludge is separated from the liquid and moved toward the outer peripheries of the plates, and then transferred from one plate to the next plate down the line until the sludge is accumulated toward the end of the line. The filtered liquid drops through the holes from one level to the next lower level, whereat the same above separating process separates the remaining finer grained sludge from the liquid and moves same toward the end of the line. The process continues until the filtered liquid at the bottom is almost completely free of sludge, and removed from the container.

8 Claims, 5 Drawing Figures

FILTER APPARATUS

CROSS REFERENCE TO RELATED APPLICATION

This application is a continuation-in-part of application Ser. No. 761,526 filed Jan. 24, 1977, now abandoned.

BACKGROUND OF THE INVENTION

This invention relates to a filter or separator apparatus, which may be used, for example in separating and collecting fine grains or particles and liquids from fine grain suspensions and emulsions.

Various methods and apparatus have been tried heretofore for filtration of fine grains from fine grain suspensions and emulsions. But, all of these prior methods and apparatus have various defects. The filter cloth method uses a cloth as a filtering or separating medium. Disadvantageously, the cloth filter method cannot be used for continuous filtrations for any length of time due to rapid sludge build up. Moreover, this method could not produce filtration of very fine grains without difficulty. Another method uses porcelain or metal pipes having numerous holes of very small diameters. Experience has shown that such holes are likely to become easily clogged by fine grains, and as a result, continuous filter operation was difficult to achieve for any length of time in many cases. Japanese Patent Publication No. 46416/1972 employes filter elements which are positioned closely to each other and around a circle. Disadvantageously, the filtering capacity was low because the surface area of the filter elements exposed to the suspension or emulsion was insufficient.

SUMMARY OF THE INVENTION

Accordingly, an object of the invention is to eliminate the above discussed and other deficiencies of the prior art.

Another object of the invention is to provide a filter or separator which can efficiently filter fine grains from suspensions or emulsions and be operable for long lengths of time without clogging.

The foregoing and other objects of the invention are attained in a filter apparatus which encompasses a container having one or more openings through which unfiltered material may be supplied, and one or more exits for passage of filtered material, such as a liquid, and one or more ports for removal of accumulated sludge; and water-tightly disposed within the container, a plurality of sets of filter elements, each set comprising a plurality of circular first plates of a predetermined diameter and having at least one hole at a predetermined distance from the center thereof, and a plurality of interleaving circular plates of a diameter smaller than the predetermined diameter, and means for holding together in order the first plate, interleaving plate, and second plate, and means for locating the two sets adjacent each other with the plates of each set disposed between each other and in close proximity thereto. The sets of elements are positioned in a straight line or row.

Means are provided for rotating the sets of filter elements in the same line in the same direction. The unfiltered material, such as an emulsion or suspension of fine grained matter, is supplied to the container through the opening with the sets of filter elements being rotated in the same direction. The heavier sludge, that is the fine grained matter, or various particles, by centrifugal force of the rotating plates is separated from the liquid and moved toward the outer periphery of the plates, and is moved or transferred from one plate to another down the line, and is accumulated toward the end of the line, such as on an accumulator plate. The filtered liquid, which may contain unseparated sludge passes through the holes from, for example, the upper most level, to the next lower level whereat the same procedure is repeated. The filtered liquid passing from level to lower level would thus contain less sludge at each succeeding level, and at the bottom, ideally would have no sludge therein, and be passed out the exit located at the bottom. In one embodiment, the filtered material is collected in a second chamber in the container and then collected and exited.

The sludge which collects on the surfaces of the plates and is transferred from one plate to another down the line and accumulated toward the end of the line, may be continously or batchwise removed. To continuously remove the sludge, the flow of unfiltered material and the separated sludge moving toward the end provides sufficient pressure to push out the accumulated sludge in each level. The accumulated sludge may also be manually removed by removing the accumulator plate on which the sludge accumulates.

Advantageously, the filtering efficiency of this apparatus is extremely high since the spaces between the filter pieces, which is solid and may advantageously be of metal, can be adjusted as desired and in accordance with the size of the fine grains contemplated to be filtered out. The holes located toward the center of the plates are used to allow separated liquid containing some amount of grains after separation from larger sized grains to flow to the next lower set of plates. Ideally, after the lowest set of plates acts on the liquid, there will be no further non-desired grains in the liquid and completely filtered liquid is removed from the container. The space between the different plates is adjusted so that grains of sizes greater than the desired size will not flow therethrough. Liquid may filter through the spaces.

Also, it is possible to continuously remove accumulated sludge by using the pressure against the sludge caused by the flow of the unfiltered material, or mechanically. The sludge accumulates in increasing amounts toward the end of the line of sets of filter elements because the turning of the filter elements in the same rotary direction causes filtered sludge to be separated from the liquid and moved by centrifugal force toward to the outer peripheries of the plates and then transferred from one plate to another along the line. Since the finer grained material is carried by the separated liquid to the next lower set of plates, and the larger grained material is transferred from one plate to another down the line, there is no possibility of clogging of the filter elements. Also, the area of contact of the sludge with the filter pieces is large and most efficient.

A feature of the invention is a filter or separation apparatus comprising a container having therein at least two sets of rotatable filter elements, each set comprising a plurality of circular first plates of a first diameter and having one or more holes at a predetermined distance from the center, a plurality of second circular plates of a diameter larger than the first diameter and having one or more holes at the predetermined distance from the center, and interleaving plates of a diameter smaller than the first diameter with the first and second plates separated by the interleaving plates; the sets of filter elements are arranged in a line; the container has one or more supply inlets, one or more sludge removal plates, and one or more exits located to be accessible to the holes of the first and second plates whereby unfiltered material is supplied through the inlet, the sets of filter elements are rotated in the same rotary direction, the sludge is separated from the liquid by the rotating action of the plates and move toward the outer periphery and then transferred from one plate to another down the line, and then accumulated toward the end of the line, and filtered liquid containing remaining finer sludge is passed through the holes of the plates from one level to the next lower level whereat the same above action of separation takes place, and repeated from level to level until at the bottom, the filtering action is completed and filtered liquid is removed.

Another feature of the invention is gears and shafts located at the center of the plates, and the rotating of the plates to cause separation of sludge from liquid and movement of the sludge toward the outer periphery, and the transferring of the sludge from one plate to another down the line to accumulate the sludge toward the end of the line.

A further feature of the invention is two or more holes in each plate of substantially the same size and shape located at substantially the same distance from the center and spaced equidistance from each other; wherein liquid containing fine grained material separated from other sludge material by the rotary action of the plate is exited from one level of plates to the next lower plates for repeated separation of sludge by rotary action of the plates; and wherein the holes of each plate can be aligned with each other or out of alignment with each other.

Another feature is the thickness of the first and second plates being substantially the same, and preferably about 1 mm.

Further features of the invention are that the first and second plates are preferably of metal, and that said first and second plates are solid except for the holes through which said separated liquid may flow.

Another feature of the invention is the use of two compartments in the container, one compartment containing the sets of filter elements in a water tight seal and having one or more outlets positioned adjacent the holes in the first and second plates and the second compartment communicated with the one or more outlets.

A further feature is the removal of sludge accumulated toward the end of the line of filter elements through an outlet by use of the pressure against the accumulated sludge by the flow of unfiltered material.

Another feature is the use of two or more even numbered lines of a plurality of sets of filter elements.

DETAILED DESCRIPTION OF PREFERRED EMBODIMENTS

Figure 1:
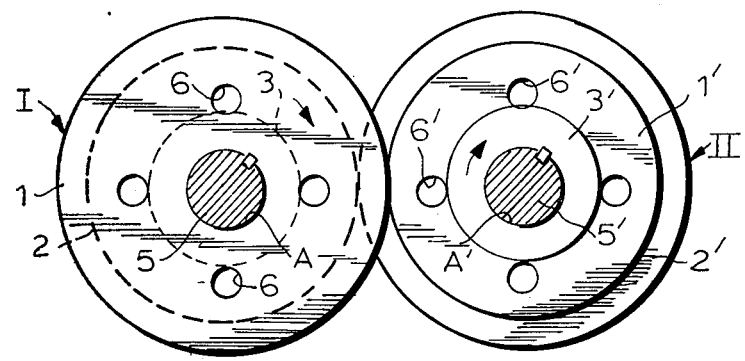
FIG. 1 is a plan view of an illustrative set of filter elements of the invention.
Figure 2:
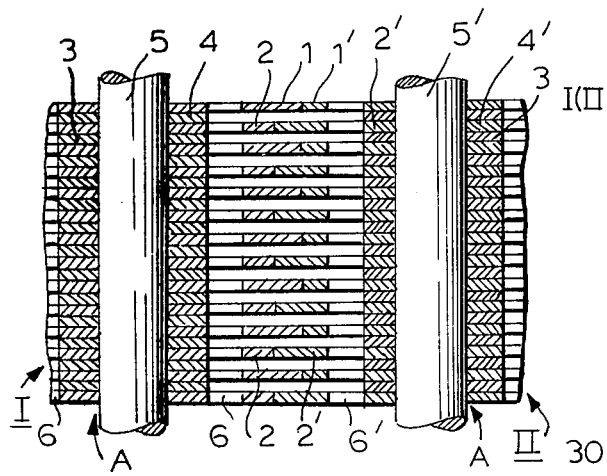
FIG. 2 is a partial elevational cross-sectional view of the embodiment of FIG. 1.

In the different figures, the same numbers will refer to the same parts. In FIGS. 1 and 2, there are depicted two sets of filter elements I and II, each comprising a plurality of circular first plates 2 and 1'(the numbers have a (') for the sets designated II) having a predetermined first diameter; a plurality of circular second filter plates 1' and 2', and having a larger diameter than the predetermined first diameter, and an interleaving circular plate 3 therebetween. Between the second and first plates in each set are similar interleaving circular plates 4. The interleaving plates 3 and 4 have a diameter smaller than the predetermined first diameter. The various first and second filter plates are solid and have as indicated holes 6,6' through which the separated liquid and remaining sludge material flow to the next lower level.

As depicted in FIG. 2, the stacked sets may be arranged to have the first and second plates close to each other and in the same plane. The plates may be disposed with such tolerances that filtered liquid may pass, but the separated sludge material of a particle size above that desired does not pass and remains on that level and transferred from plate to plate down the line.

As depicted in FIG. 1, each of the first and second plates have one or more holes 6 and 6' located at the same distance from the center. If there is more than one hole in each plate, the two or more holes are spaced preferably equidistance from each other and at the same radius. When the first and second plates are stacked together, the holes in each need not be aligned with respect to each other, nor need the holes be at the same radial distance. The holes in each plate are preferably of the same size and shape.

The plates may be of any suitable material, such as metal and the thickness of the first and second plates may differ in accordance with the diameters of the fine grain in suspension or emulsion desired to be filtered out. In the average case, thicknesses corresponding to the diameters of grains under 1 mm will suffice. The thickness of the first and second plate are, however, preferably the same.

Each of the first plates, second plates and interleaving plate has a hole A or A'in the center thereof (such as in FIGS. 1 and 2) for placement of a shaft 5 or 5' therein. The plates may be affixed to the shaft itself for enabling rotation of the stacked sets by the shaft 5. When the holes are at the center, by suitable adjustment of the spaces between the shafts, the degree of closeness of the plate edges can be controlled.

The total number of first and second plates 1,1',2,2' in each set is preferably the same and the diameters of the first plates are preferably different from the diameters of the second plates. The first and second plates are preferably mounted in alternate order with interleaving plates 3,4 therebetween. The sets I and II are positioned such that as shown in FIG. 2, the shorter first filter plate 1' of set I is in the same plane and in close proximity to the larger second filter plate 1 of set II.

Holes 6 and 6' will preferably be at the same distance from the center.

Figure 5:
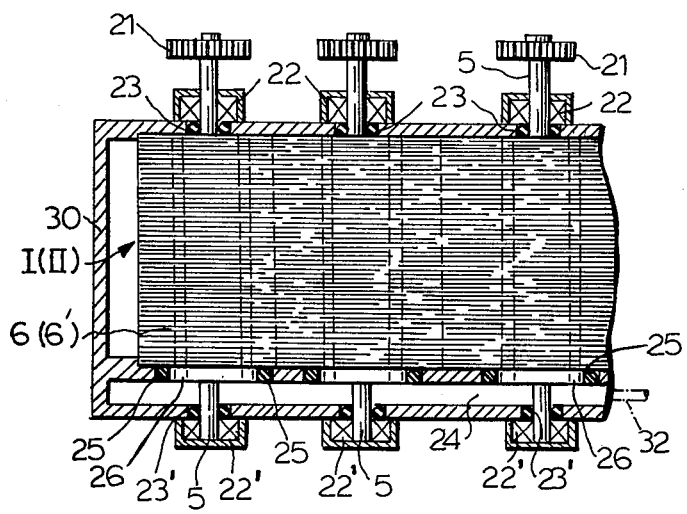
FIG. 5 is a partial elevational cross-sectional view of the filter apparatus in more detail.
Figure 3:
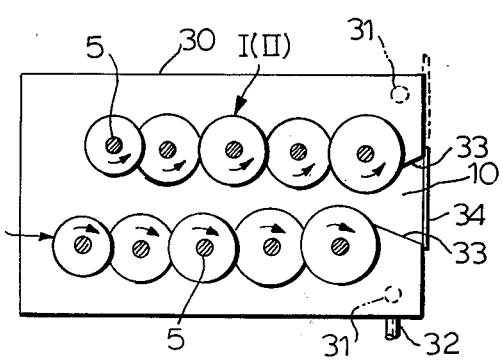
FIG. 3 is a plan view of an illustrative filter apparatus employed in a container with a plurality of sets of filter elements disposed in two straight lines.
Figure 4:
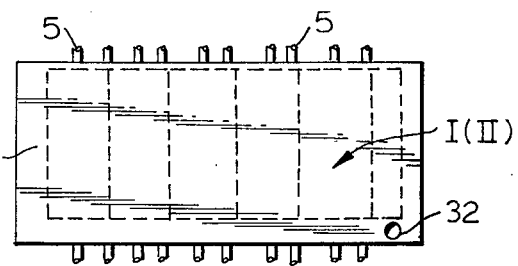
FIG. 4 is an elevational view of the embodiment of FIG. 3.

As depicted in FIGS. 3, 4, 5, two or more sets of filter elements I and II may be placed in two or more, and preferably an even number of straight lines in container 30. Container 30, which may be rectangular in shape, is preferably water tight and has one or more supply inlets 31 and one or more exits 32 (for filtered liquid). The sludge outlet 10 and the surface of the final element of each of the sets of filter elements I and II should be connected to sludge removal plate 33. The sludge outlet 10 has a door which closes and opens. The sludge removal can be continuous and be accomplished by opening the outlet 10 and having the flow of liquid contained in the unfiltered material go through holes 6,6', compartment 24 and outlet 32 and the remaining sludge transported by the rotation of the filter elements pushes out the sludge through outlet 10 and the door therein. The plate like removal device 33 is disposed between the end of the line of sets of filter elements and the sludge outlet 10, as shown in FIG. 3. Since the filter elements are all rotated in the same rotary direction, in the same line, the sludge is first separated from the liquid, moved to the outer periphery of the plates, and then transferred from plate to plate down the line, and then accumulated in increasing amounts toward the end of the line. The accumulated sludge may tend to pile up on remover plate 33.

Turning now to FIG. 5, the first plates, second plates and interleaving plates 3,4 are mounted on shafts 5,5'. Gears 21 are mounted on the respective shafts 5,5' for driving the sets of filter elements in the same rows in the same direction such as shown by arrows in FIG. 3, using a motor means not shown.

Shafts 5,5' are water-tightly sealed at the top of container 30 with packings 23 and bearing 22, and at the bottom of container 30 with packings 23' and bearings 22'. The container 30 is preferably of water tight construction and has two separate compartments. The upper compartment preferably contains the filter elements sets sealed in by plugs 25 from the lower compartment 24. Between the upper and lower compartments, are one or more openings 26 located at the same distance from the center axis and hence aligned with holes 6,6' of the filter plates so that the filtered liquid will pass through holes 6,6' and through holes 26 and collect in the lower compartment 24 and be drained therefrom through exit 32. Of course the lower compartment 24 is not essential.

The filter apparatus operates as follows. The sludge take out port 10 of container 30 is closed to be water tight by closing door 34. Unfiltered material, such as fine grain suspension or emulsion is supplied to container 30 through one or more inlets 31 (see FIG. 3). The container is preferably maintained at a pressure above atmospheric pressure. After the unfiltered material contacts the upper level plates the shafts 5,5' of the sets of elements are all driven in the same rotary direction for the same line, by motor means transferred via gears 21 connected to the shafts. Thus, by centrifugal force, sludge particles are separated from the liquid and moved toward the outer periphery of the plates. Then, in each level, the sludge is transferred from plate to plate down the line and sludge is accumulated toward the end of the line, such as on remover plate 33. At the upper most level, the larger particles would tend to be rotated outwardly first, and other usually smaller particles would tend to remain in the liquid. That liquid containing the remaining sludge particles after separation of the other sludge particles, is then flowed downward through the holes 6,6' to the next lower level whereat the same rotary action of the plates will cause other particles still in the liquid to be separated out and moved toward the outer periphery of the plates, then transferred plate to plate down the line and accumulated toward the end of the line at that level. After repeated filtering action from level to level, the remaining liquid is substantially completely filtered and exited through the bottom of the container.

In one embodiment, wherein two straight lines or rows of sets of filter elements are used, such as shown in FIG. 3, the elements in one line are rotated in one direction, and the elements in the other line are rotated in the other opposite direction. In this manner, and with the supply inlet located toward the end of the line (see FIG. 3), the sludge would tend to be transferred from right to left at the outer areas and from the left to right in the center areas. This is advantageous in that the sludge would tend to accumulate at the take out port 10 and sludge removal is simplified and made more efficient.

The rotary speed of the filter elements may be varied according to the material being filtered. In one embodiment, the rotary speed was about one revolution per 15 minutes.

The grains are prevented from travelling between the first and second plates 1,1' and 2,2' because of the close tolerances therebetween. The particle matters are separated from the liquid by centrifugal force of the plates. There will be some escape but most of the separation will take place at the upper most levels and fewer and fewer grains will be filtered as the material flows down to the lower levels. The sludge separated from the liquid by the rotating action will tend to move toward the outer peripheries of the plates, and then transferred from plate to plate down the line and accumulated toward the end of the line. The same direction of rotation of the sets of plates in each line enables this accumulation to take place. The filtered liquid which toward the upper levels contains some sludge left over after separation of other sludge material by the rotating action, is caused to travel through holes 6,6' and then ( in case of FIG. 5) though openings 26 and collect in compartment 24 for drainage through exits 32. Container 30 usually is not filled completely with unfiltered material since each lower level of plates would tend to have fewer and fewer particulate material, and only filtered liquid remains toward the bottom and flows through holes 6,6'.

The grains may collect on the surfaces of the plates and thicken in layers with passage of time and increase of unfiltered material. This is more likely toward the end of the line rather than toward the front of the line. The accumulation may be such that the pressure from the flow of unfiltered material may not be sufficient to remove the accumulated sludge. The sludge may be removable using mechanical means, such as manually taking out the sludge removal plate 33 after opening door and outlet 10. The sludge usually builds up on sludge removal plate 33, and the pressure of the flow of unfiltered material would be usually sufficient to push out the accumulated sludge through outlet 10. Also, entire sets of plates may be removed, cleaned and replace in another embodiment. Advantageously, sludge removal is efficient and convenient. It may be done continuously while continuing the filtering action.

Repeating the above operations makes possible rapid, convenient, easy separation and collection of fine grains and liquids from emulsions and suspensions, and the like.

Advantageously, this invention uses a plurality of levels of separation plates which rotate in the same rotary directions, in a line. The material to be filtered may contain particles of different sizes in a liquid. The material to be filtered out starts at the top level of the plates at the front of the line. By centrifugal force, the rotating plates will separate the sludge from the liquid and cause the sludge to move toward the outer peripheries of the plates. The remaining filtered liquid which may contain sludge particles, goes through holes 6,6' to the next lower level, whereat the same centrifugal action will separate the grains from the liquid and so on until the remaining liquid toward the lower parts is substantially filtered and contains only particles of the size desired or smaller. The plates are situated with respect to each other in a manner that liquid and particles smaller than the size desired may go between the plates, but other larger particles will not go through the spaces between the plates. At each level, the sludge which moves toward the outer periphery is transferred from plate to plate down the line until it is accumulated, for example, on remover plate 33, toward the end of the line. The accumulated sludge may be removed through door 34 either mechanically or by force of the other sludge moving from the front of the line toward the end of the line forcing out the accumulated sludge.

The foregoing description is illustrative of the principles of the invention. Numerous other variations and modifications thereof would be apparent to the worker skilled in the art. All such modifications and variations are to be considered to be within the spirit and scope of the invention.

What is claimed is:

1. A filter apparatus comprising
   (A) a container having one or more openings for supplying unfiltered material and one or more exits for removing filtered liquid material;
   (B) at least one line of sets of rotatable filter elements disposed within said container, each set comprising
      (i) a plurality of circular first plates having a first diameter, each plate having at least one hole at a predetermined distance from the center thereof,
      (ii) a plurality of circular second plates having a diameter larger than said first diameter, each plate having at least one hole at said predetermined distance from the center thereof, and being of a size and shape substantially similar to said at least one hole in said first plates,
      (iii) a plurality of interleaving circular plates of a third diameter smaller than said first diameter, and
      (iv) means for holding said first plate, interleaving plate, and second plate in that order in each set with their centers in substantially the same axis and within said container in substantially sealed manner, whereby said at least one hole of each of said first and second plates are aligned with said one or more exits with one set disposed adjacent the other set with the first plate of one set adjacent the second plate of the other set and in the same plane; and
   (c) means for moving said sets in the same line of filter elements in the same rotary direction, whereby unfiltered material is supplied to said one or more opening of said container and by centrifugal force of the rotating plates sludge is separated from liquid and moved toward the outer periphery of the plates and then transferred from one plate to the next down the line and accumulated toward the end of the line, and filtered liquid material remaining after the separation passes through said at least one hole of said first and second plates and sludge remaining in said filtered liquid material is on the lower next level separated by similar rotating of said plates, moved toward the outer peripheries of the plates, then transferred from plate to plate in a line and accumulated toward the end of the line at said next lower level, with the again filtered liquid material dropping level by level until substantially filtered liquid is removed from said one or more exits.

2. The filter apparatus of claim 1, wherein said means for moving comprises gear means and shaft means located at the center of said first and second plates.

3. The filter apparatus of claim 1, wherein more than two holes are provided in each of said first and second plates, said holes being located at substantially the same distance from the centers of the respective first and second plates.

4. The filter apparatus of claim 1, wherein the thickness of each of said first and second plates are substantially the same.

5. The filter apparatus of claim 1, wherein the thickness of said first and second plates are about 1 mm.

6. The apparatus of claim 1, wherein said first and second plates are of metal.

7. The apparatus of claim 1, wherein said container has two compartments with the first, second and interleaving plates substantially sealed in one compartment, with said one or more exits leading from said one compartment to the other compartment, wherein said filtered liquid material is collected.

8. The apparatus of claim 1, wherein at least two lines are provided with each line having a plurality of sets of elements, and said means for moving rotates the sets of elements in one line in the same rotary direction and the sets of elements in the second line in the opposite rotary direction, and said unfiltered material is supplied in two inlets disposed at one end of said lines, and sludge is accumulated toward said end of said line.

* * * * *